United States Patent
Yap et al.

(10) Patent No.: US 7,085,499 B2
(45) Date of Patent: Aug. 1, 2006

(54) AGILE RF-LIGHTWAVE WAVEFORM SYNTHESIS AND AN OPTICAL MULTI-TONE AMPLITUDE MODULATOR

(75) Inventors: Daniel Yap, Thousand Oaks, CA (US); Keyvan Sayyah, Santa Monica, CA (US)

(73) Assignee: HRL Laboratories, LLC, Malibu, CA (US)

( * ) Notice: Subject to any disclaimer, the term of this patent is extended or adjusted under 35 U.S.C. 154(b) by 589 days.

(21) Appl. No.: 10/116,801

(22) Filed: Apr. 5, 2002

(65) Prior Publication Data

US 2003/0090767 A1 May 15, 2003

Related U.S. Application Data

(60) Provisional application No. 60/332,367, filed on Nov. 15, 2001.

(51) Int. Cl.
  *H04B 10/04* (2006.01)
  *H04B 10/12* (2006.01)
  *H04B 10/00* (2006.01)

(52) U.S. Cl. .................... 398/183; 398/186; 398/161

(58) Field of Classification Search ............. 398/182, 398/183, 185, 198, 186, 161, 195; 372/26, 372/25, 31, 29.01, 29.04
See application file for complete search history.

(56) References Cited

U.S. PATENT DOCUMENTS

| 4,028,702 A | 6/1977 | Levine ............... 343/100 SA |
| 4,296,319 A | 10/1981 | Franks et al. ............. 250/227 |
| 5,001,336 A | 3/1991 | de la Chapelle ....... 250/208.2 |
| 5,153,762 A | 10/1992 | Huber ..................... 359/125 |
| 5,383,198 A | 1/1995 | Pelouch et al. ............. 372/18 |
| 5,404,006 A | 4/1995 | Schaffner et al. ...... 250/208.2 |
| 5,428,814 A | 6/1995 | Mort et al. ............... 455/12.1 |
| 5,504,774 A | 4/1996 | Takai et al. ............... 375/134 |
| 5,577,057 A | 11/1996 | Frisken ..................... 372/18 |
| 5,617,239 A | 4/1997 | Walker ..................... 359/181 |
| 5,625,729 A | 4/1997 | Brown ....................... 385/31 |
| 5,687,261 A | 11/1997 | Logan ....................... 385/24 |
| 5,710,651 A | 1/1998 | Logan, Jr. ................. 359/145 |
| 5,723,856 A * | 3/1998 | Yao et al. ............ 250/227.11 |
| 5,777,778 A | 7/1998 | Yao .......................... 359/245 |

(Continued)

FOREIGN PATENT DOCUMENTS

EP 0 352 747 A2 1/1990

(Continued)

OTHER PUBLICATIONS

Bennett, S., et al., "1.8-THz Bandwidth, Zero-Frequency Error, Tunable Optical Comb Generator for DWDM Applications," *IEEE Photonics Technology Letters*, vol. 11, No. 5, pp. 551-553 (May 1999).

(Continued)

*Primary Examiner*—Jason Chan
*Assistant Examiner*—Quan-Zhen Wang
(74) *Attorney, Agent, or Firm*—Ladas & Parry LLP

(57) ABSTRACT

A waveform synthesizer comprising for synthesizing RF lightwave waveforms in the optical domain. These waveforms are constructed by generating their constituent Fourier frequency components or tones and then adjusting the amplitudes of those frequency components or tones. The apparatus includes: a RF-lightwave frequency-comb generator; and a multi-tone, frequency selective amplitude modulator coupled to the RF-lightwave frequency-comb generator for generating a continuous-wave comb comprising a set of RF tones amplitude modulated onto a lightwave carrier.

47 Claims, 8 Drawing Sheets

U.S. PATENT DOCUMENTS

| | | | |
|---|---|---|---|
| 5,796,506 A | 8/1998 | Tsai | 359/191 |
| 5,859,611 A | 1/1999 | Yao | 250/227.1 |
| 5,861,845 A | 1/1999 | Lee et al. | 342/375 |
| 5,917,179 A | 6/1999 | Yao | 250/227.11 |
| 5,917,970 A | 6/1999 | Burns et al. | 385/24 |
| 5,930,031 A | 7/1999 | Zhou et al. | 359/344 |
| 5,933,113 A | 8/1999 | Newburg et al. | 342/375 |
| 5,999,128 A | 12/1999 | Stephens et al. | 342/375 |
| 6,027,254 A | 2/2000 | Yamada et al. | 385/88 |
| 6,061,369 A | 5/2000 | Conradi | 372/6 |
| 6,178,036 B1 | 1/2001 | Yao | 359/334 |
| 6,188,808 B1 | 2/2001 | Zhou et al. | 385/3 |
| 6,195,187 B1 | 2/2001 | Soref et al. | 398/9 |
| 6,262,681 B1 | 2/2001 | Persechini | 342/188 |
| 6,215,592 B1 | 4/2001 | Pelekhaty | 359/260 |
| 6,348,890 B1 | 2/2002 | Stephens | 342/375 |
| 6,388,787 B1 | 5/2002 | Bischoff | 359/187 |
| 6,452,546 B1 | 9/2002 | Stephens | 342/368 |
| 6,580,532 B1 * | 6/2003 | Yao et al. | 398/39 |
| 6,591,026 B1 * | 7/2003 | Endo et al. | 385/15 |
| 6,643,299 B1 * | 11/2003 | Lin | 372/6 |
| 6,724,523 B1 | 4/2004 | Jalai et al. | 372/9 |
| 6,724,783 B1 * | 4/2004 | Jalali et al. | 372/9 |
| 6,731,829 B1 | 5/2004 | Ionov | 385/15 |
| 6,852,556 B1 | 2/2005 | Yap | 438/22 |
| 6,867,904 B1 | 3/2005 | Ng et al. | 359/332 |
| 6,872,985 B1 | 3/2005 | Yap | 257/82 |
| 6,940,878 B1 | 9/2005 | Orenstein et al. | 372/20 |
| 2001/0038313 A1 | 11/2001 | Johnson et al. | 331/135 |
| 2002/0021464 A1 | 2/2002 | Way | 359/124 |
| 2002/0122615 A1 | 9/2002 | Painter et al. | 385/15 |
| 2003/0003961 A1 | 1/2003 | Li et al. | 455/562 |
| 2003/0080898 A1 | 5/2003 | Wang et al. | 342/359 |
| 2003/0089843 A1 | 5/2003 | Sayyaah et al. | 250/227.21 |
| 2003/0090767 A1 | 5/2003 | Yap et al. | 359/181 |
| 2003/0091097 A1 | 5/2003 | Yap et al. | 375/132 |
| 2003/0197917 A1 | 10/2003 | Yap et al. | 359/330 |
| 2003/0227629 A1 | 12/2003 | Dobbs et al. | 356/437 |
| 2004/0120638 A1 | 6/2004 | Frick | 385/27 |
| 2004/0264977 A1 | 12/2004 | Yap et al. | 398/161 |
| 2005/0013612 A1 | 1/2005 | Yap | 398/53 |

FOREIGN PATENT DOCUMENTS

| | | |
|---|---|---|
| JP | 07-26136 | 1/1995 |
| JP | 07-264136 | 10/1995 |
| WO | 99/66613 | 12/1999 |
| WO | 00/44074 | 7/2000 |
| WO | 00/45213 | 8/2000 |
| WO | 00/45213 A1 | 8/2000 |
| WO | 01/29992 A1 | 4/2001 |
| WO | 01/80507 | 10/2001 |
| WO | 02/099939 A1 | 12/2002 |
| WO | 03/0042734 | 5/2003 |
| WO | 03/043126 A1 | 5/2003 |
| WO | 03/043177 A2 | 5/2003 |
| WO | 03/043178 A2 | 5/2003 |
| WO | 03/043195 A1 | 5/2003 |
| WO | 03/043231 A2 | 5/2003 |

OTHER PUBLICATIONS

Bilodeau, F., et al., "An All-Fiber Dense-Wavelength-Division Multiplexer/Demultiplexer Using Photoimprinted Bragg Gratings," *IEEE Photonics Technology Letters*, vol. 7, No. 4, pp. 388-390 (Apr. 1995).

Chu, S., et al., "An Eight-Channel Add-Drop Filter Using Vertically Coupled Microring Resonators over a Cross Grid," *IEEE Journal of Technology Letters*, vol. 11, No. 6, pp. 691-693 (Jun. 1999).

Haus, H., et al., "Narrow-Band Optical Channel-Dropping Filter," *Journal of Lightwave Technology*, vol. 10, No. 1, pp. 57-61 (Jan. 1992).

Kazarinov, R., et al., "Narrow-Band Resonant Optical Reflectors and Resonant Optical Transformers for Laser Stabilization and Wavelength Division Multiplexing," *IEEE Journal of Quantum Electronics*, vol. QE-23, No. 9, pp. 1419-1425 (Sep. 1987).

Little, B. E., et al., "Wavelength Switching and Routing Using Absorption and Resonance," *IEEE Photonics Technology Letters*, vol. 10, No. 6, pp. 816-818 (Jun. 1998).

Yao, X.S., "Multiloop Optoelectronic Oscillator," *IEEE Journal of Quantum Electronics*, vol. 36, No. 1, pp. 79-84 (Jan. 2000).

Yao, X.S., et al., "Optoelectronic Oscillator for Photonic Systems," *IEEE Journal of Quantum Electronics*, vol. 32, No. 7, pp. 1141-1149 (Jul. 1996).

Abstract of JP 07-264136, *Patent Abstracts of Japan*, vol. 1996, No. 02 (Feb. 1996).

Yamamoto, T., et al., "270-360 Ghz Tunable Beat Signal Light Generator For Photonic Local Oscillator," *Electronics Letters*, vol. 38, No. 15, pp. 795-797 (Jul. 2002).

Yao, X.S., et al., "High Frequency Optical Subcarrier Generator," *Electronics Letters*, vol. 30, No. 18, pp. 1525-1526 (Sep. 1, 2994).

Yao, X.S., et al., "Optoelectronic Oscillator for Photonic Systems," *IEEE Journal of Quantum Electronics*, vol. 32, No. 7, pp. 1141-1149 (Jul. 1996).

U.S. Appl. No. 10/696,607, filed Oct. 28, 2003, Yap.

U.S. Appl. No. 10/766,103, filed Jan. 24, 2004, Ng, et al.

Agrawal, G.P., Nonlinear Fiber Optics, *Academic Press*, Chapter 9, pp. 370-398 (1995).

Alexe, M., et al., "Low Temperature GaAs/Si Direct Wafer Bonding," *Electronic Letters*, vol. 36, No. 7, pp. 677-678 (2000).

Bordonalli, A.C., et al., "High Performance Phase Locking of Wide Linewidth Semiconductor Lasers by Combined Use of Optical Injection Locking and Optical Phase-Lock Loop," *Journal of Lightwave Technology*, vol. 17, No. 2, pp. 328-342 (Feb. 1999).

Chan, W.K., et al., "Grafted Semi-Conductor Optoelectronics," *IEEE Journal Of Quantum Electronics*, vol. 27, No. 3, pp. 717-725 (Mar. 1991).

Chang, K., Handbook of Microwave and Optical Components, *John Wiley and Sons*, pp. 595-626, 670-674 (1989).

Chu, S. T., et al., "Wavelength Trimming of a Microring Resonator Filter by Means of a UV Sensitive Polymer Overlay," *IEEE Photonics Technology Letters*, vol. 11, No. 6, pp. 688-690 (1999).

Collins, J.V., et al., "Passive Alignment of Second Generation Optoelectronic Devices," IEEE Journal of Selected Topics in Quantum electronics, vol. 3, No. 6, pp. 1441-1444 (Dec. 1997).

Corbett, B., "Spectral Characteristics of Low Threshold Microdisks," *IEEE Lasers and Electro-Optics Society 1996 Annual Meeting*, vol. 2, pp. 197-198 (1996).

Corbett, B., et al., "Low-Threshold Lasing in novel Microdisk Geometries," *IEEE Photonics Technology Letters*, vol. 8, No. 7, pp. 855-857 (Jul. 1996).

Deckman, B., et al., "A 5-Watt, 37-GHz Monolithic Grid Amplifier," *IEEE MTT-S Digest*, paper WE2D-3, pp. 805-808 (2000).

Escalera, N., et al., "Ka-Band, 30 Watts Solid State Power Amplifier," *IEEE MTT-S Digest*, paper TU1F-42, pp. 561-563 (2000).

Fukushima, S., et al., "Direct Opto-Electronic Synthesis of mW-Level Milimeter-Wave Signals Using an Optical Frequency Comb Generator and a Uni-Traveling-Carrier Phototide," IEEE MTT-S Digest, pp. 69-72 (2001).

Ghirardi, F., et al., "Monlithic Integration of an InP Based Polarization Diversity Heterodyne Photoreceiver with Electrooptic Adjustablity," *Journal of Lightwave Technology*, vol. 13, No. 7, pp. 1536-1549 (Jul. 1995).

Goldsmith, C., et al., "Principals and Performances of Traveling-Wave Photodetector Arrays," *IEEE Transactions on Microwave Theory and Techniques*, vol. 45, No. 8 1342-1350 (1997).

Hansen, D.M., et al., "Development of a Glass-Bonded Compliant Substrate," *Journal of Crystal Growth*, vol. 195, pp. 144-150 (1998).

Ingram, D.L., et al., "Compact W-Band Solid State MMIC High Power Sources," *IEEE MTT-S Digest*, paper WE4A-4, pp. 955-958 (2000).

Jayaraman, V., et al., "Extended Tuning Range in Sampled Grating DBR Lasers," *IEEE Photonics Technology Letters*, vol. 5, pp. 489-491 (May 1991.

Kato, K., et al., "Ultrawide-Band/High-Frequency Photodetectors," *IEEE Transactions on Microwave Theory and Techniques*, vol. 47, No. 7, pp. 1265-1281 (1999).

Kato, K., et al., "PLC Hybrid Integration Technology and Its Application to Photonic Components," *IEEE Journal of Selected Topics in Quantum Electronics*, vol. 6, No. 1, pp. 4-13 (2000).

Kazovsky, L.G., et al., "A 1320-nm Experimental Optical Phase-Locked Loop: Performance Investigation and PSK Homodyne Experiments at 140 Mb/s and 2 Gb/s," *Journal of Lightwave Technology*, vol. 8, No. 9, pp. 1414-1425 (Dec. 1988).

Kikuchi, K., et al., "Amplitude-Modulation Sideband Injection Locking characteristics of Semiconductor Lasers and their Application," *Journal of Lightwave Technology*, vol. 6, No. 12, pp. 1821-1830 (Dec. 1988).

Kitayama, K., et al., "Highly-Stabilized, Tunable Millimeter-Wave Generation by Using Fiber-Optic Frequency Comb Generator," *Microwave Photoncs*, pp. 13-16 (Dec. 3, 1996).

Kobayashi, Y., et al., "Optical FM signal Amplification and FM Noise reduction in an Injection Locked AlGaAs Semiconductor Laser," *Electronics Letters*, vol. 17, No. 22, pp. 849-851 (Oct. 29, 1981).

Lee, C.C., et al., "Measurement of Stimulated-Brillouin-Scattering Threshold for Various Types of fibers Using Brillouin Optical-Time-Domain Reflectometer," *IEEE Photonics Technology Letters*, vol. 12, No. 6, pp. 672-674 (Jun. 2000).

Little, B.E., et al., "Ultra-Compact Si-SiQ$_2$ Microring Resonator Optical Channel Dropping Filters," *IEEE Photonics Technology Letters*, vol. 10, No. 4, pp. 549-551 (Apr. 1998).

Liu, T., et al., "InP-Based DHBT with 90% Power-Added Efficiency and 1 W Output Power at 2GHz," *Solid-State Electronics*, vol. 41, No. 10, pp. 1681-1686 (1997).

London, Joanna M. et al., "Preparation of a Silicon-on-Gallium Arsenide Wafers for Monolithic Optoelectronic Integration," *IEEE Photonics Technology Letters*, vol. 11, No. 8, pp. 144-150 (1998).

MacDonald, R.I., et al., "Hybrid Optoelectronic Integrated Circuit," *Applied Optics*, vol. 26, No. 5, pp. 842-844 (Mar. 1, 1987).

Murthy, S., et al., "A Novel Monolithic Distributed Traveling-Wave Photodetector with Parallel Optical Feed," *IEEE Photonics Technology Letters*, vol. 12, No. 6, pp. 681-683 (2000).

Ng, W., et al. "High-Efficiency Waveguide-Coupled $\lambda=1.3$ μm $In_x Ga_{1-x}As$/GaAs MSM Detector Exhibiting Large Extinction Ratios at $L$ and $X$ Band," IEEE Photonics Technology Letters, vol. 5, No. 5, pp. 514-517 (1993).

Ng, W., et al., "High-Speed Single-and Multi-Element Fiber-Grating Coupled Diode laser Transmitters for WDM Networks," IEEE, pp. 362-363 (1998).

Oda, K., et al., "A Wide-FSR Waveguide Double-Ring Resonator for Optical FDM Transmission Systems," *Journal of Lightwave Technology*, vol. 9, No. 6, pp. 728-736 (Jun. 1991).

*Radio Frequency Photonic Synthesizer*, United Telecommunicatons Products, Inc., Chalfont, PA, Transmission Systems Division, (Jan. 2000).

Ramos, R.T., et al., "Optical Injection Locking and Phase-Lock Loop Combined Systems," *Optics Letters*, vol. 11, No. 10, pp. 4-6 (Jan. 1, 1994).

Sakamoto, S.R. et al., "Substrate Removed GaAs-AlGaAs Electropic Modulators," *IEEE Photonics Technology Letters*, vol. 11, No. 10, pp. 1244-1246 (1999).

Sarlet, G., et al., "Wavelength and Mode Stabilization of Widely Tunable SG-DBR and SSG-DBR Lasers," *IEEE Photonics Technology Letters*, vol. 11, No. 11, pp. 1351-1353 (Nov. 1999).

Schaeffer, C. G., "Application of Optical Amplifiers in a Microwave Distribution Network for Phased Array Antennas," *Lasers and Electro-Optics Society Annual Meeting, 1995, 8th Annual Meeting Conference Proceedings*, vol. 1, pp. 202-203 (Oct. 30-31, 1995).

Shimizu, N., et al., "InP-InGaAs Uni-Traveling-Carrier Photodiode With Improved 3-dB Bandwidth of Over 150 GHz," *IEEE Photonics Technology Letters*, vol. 10, No. 3, pp. 412-414 (1998).

Tishinin, D. V., et al., "Vertical Resonant Couplers with Precise Coupling Efficiency Control Fabricated by Wafer Bonding," *IEEE Photonics Technology Letters*, vol. 11, No. 8, pp. 1003-1005 (1999).

Tsao, S..-L, "Phaselocked Tunable Subcarrier Comb Generator," *Electronic Letters*, vol. 30, No. 24, pp. 2059-2060 (Nov. 24, 1994).

Yanagisawa, M., et al., "Film-Level Hybrid Integration of AlGaAs Laser Diode with Glass Waveguide on Si Substrate," *IEEE Photonics Technlogy Letters*, vol. 4, No. 1, pp. 21-23 (Jan. 1992).

Yi-Yan, A., et al., "GaInAs/InP pin Photodetectors Integrated with Glass Waveguides," *Electronics Letters*, vol. 27, No. 1, pp. 87-89 (Jan. 3, 1991).

Yi-Yan, A., et al., "Semiconductor-film Grafting: A New Approach to OEICs," *Circuits & Devices*, pp. 26-30 (May 1992).

Zmuda, H., et al., "Photonics Beamformer for Phased Array Antennas Using a Fiber Grating Prism," *IEEE Photonics Technology Letters*, vol. 9, No. 2 pp. 241-243 (Feb. 1997).

* cited by examiner

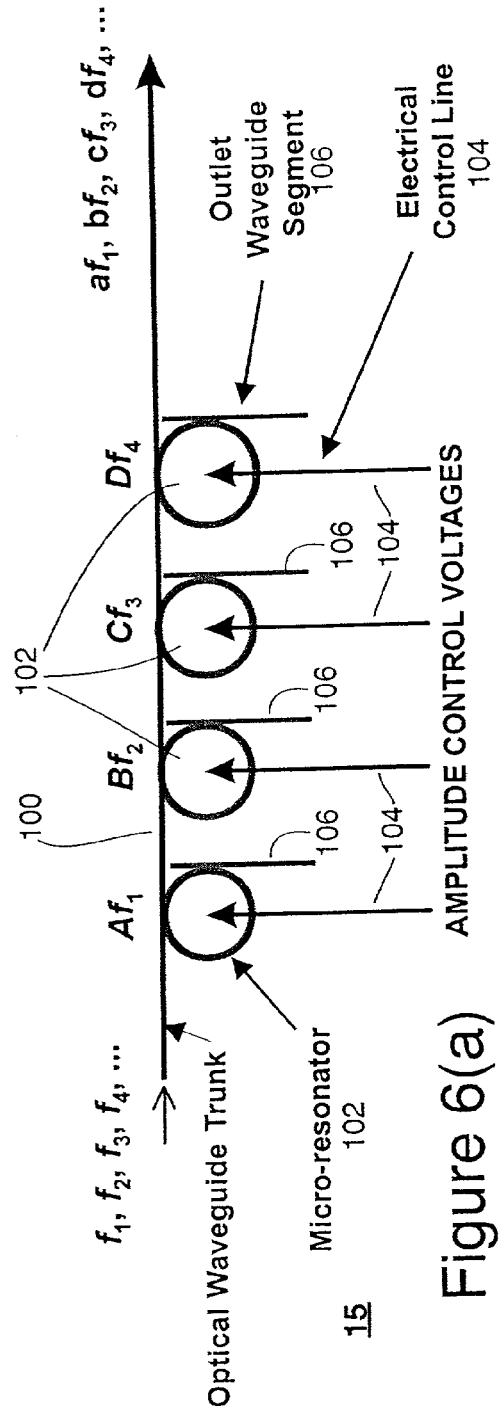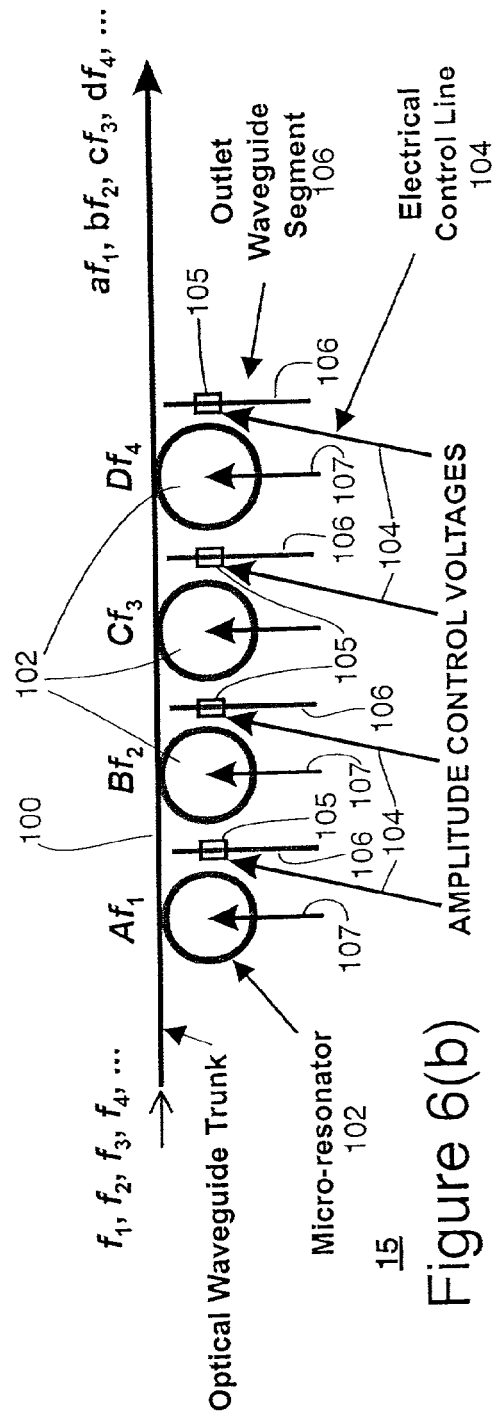

AGILE RF-LIGHTWAVE WAVEFORM SYNTHESIS AND AN OPTICAL MULTI-TONE AMPLITUDE MODULATOR

CROSS REFERENCE TO RELATED APPLICATIONS

This application claims the benefit of U.S. provisional application No. 60/332,367 filed Nov. 15, 2001 for an "Agile RF-Lightwave Waveform Synthesis and an Optical Multi-Tone Amplitude Modulator" by Daniel Yap and Keyvan Sayyah, the disclosure of which is hereby incorporated herein by reference.

This application is related to a provisional patent application entitled "Agile Spread Waveform Generator" bearing Ser. No. 60/332,372 and filed Nov. 15, 2001, and its corresponding non-provisional application bearing Ser. No. 10/116,829 and filed on the same date as the present application, the disclosures of which are hereby incorporated herein by this reference. These related applications are owned by the assignee of this present application.

This application is also related to a provisional patent application entitled "Injection-seeding of a Multi-tone Photonic Oscillator" bearing Ser. No. 60/332,371 and filed Nov. 15, 2001, and its corresponding non-provisional application bearing Ser. No. 10/116,799 and filed on the same date as the present application, the disclosures of which are hereby incorporated related applications are owned by the assignee of this present application.

This application is also related to a patent application entitled "Remotely Locatable RF Power Amplification System" bearing Ser. No. 60/332,368 and filed Nov. 15, 2001, and its corresponding non-provisional application bearing Ser. No. 10/116,854 and filed on the same date as the present application, the disclosures of which are hereby incorporated herein by this reference. These related applications are owned by the assignee of this present application.

This application is also related to a patent application entitled "Waveguide-Bonded Optoelectronic Devices" bearing Ser. No. 60/332,370 and filed Nov. 15, 2001, and its corresponding non-provisional application bearing Ser. No.10/116,800 and filed on the same date as the present application, the disclosures of which are hereby incorporated herein by this reference. These related applications are owned by the assignee of this present application.

TECHNICAL FIELD

This invention relates to optical techniques for synthesizing RF-modulated lightwave waveforms as well as corresponding RF waveforms. By following the teachings of this invention, a variety of wideband RF-modulated lightwave waveforms can be synthesized in the form of amplitude modulation tones on a lightwave carrier. These waveforms are constructed by generating the component frequencies of the waveform in the lightwave domain and by adjusting the amplitudes of those components. A RF waveform can then be obtained by photodetection of the modulated lightwave waveform. Furthermore, a frequency-shifted version of the RF waveform can be obtained by using optical heterodyning techniques that combine the modulated multi-tone lightwave waveform with a single-tone lightwave reference.

Also disclosed are two embodiments of an optical multi-tone amplitude modulator, which finds use in the disclosed optical circuits and optical techniques.

BACKGROUND OF THE INVENTION

The present invention relates to an optical method of synthesizing arbitrary RF-lightwave or RF waveforms. Prior methods can generate multiple RF tones but have no provision for selectively adjusting the amplitudes of those tones. Known methods can be used to generate multi-tone RF combs amplitude-modulated on lightwave carriers. This invention improves upon such known techniques by filtering select lightwave frequencies and applying them to amplitude modulate the tones of the comb.

Prior art digital electronic synthesizers are quite versatile, but can produce waveforms that have bandwidths of only several hundred megahertz. Analog electronic synthesizers are capable of higher bandwidths, as high as several tens of gigahertz, but the waveforms are quite simple (comprised of only a few tones). The disclosed optical methods and apparatus of this invention, which allow for synthesizing the waveforms while in the lightwave domain, can produce waveforms with bandwidths in excess of one terahertz and that are comprised of a large number of tones.

The prior art includes the following:

(1). 1.8-THz bandwidth, tunable RF-comb generator with optical-wavelength reference—see the article by S. Bennett et al. Photonics Technol. Letters, Vol. 11, No. 5,pp. 551–553, 1999.

This paper describes multi-tone RF-lightwave comb generation using the concept of successive phase modulation of a laser optical waveform in an amplified circulating fiber loop. A phase modulator in an amplified re-circulating fiber loop generates the RF-lightwave frequency comb. In this comb generator, the lightwave signal from a laser injected into an optical loop undergoes phase modulation and optical amplification on each round trip. A series of optical sidebands spaced exactly by the RF modulation frequency applied to the phase modulator are generated.

(2). Multi-tone operation of a single-loop optoelectronic oscillator—see an article by S. Yao and L. Maleki, IEEE J. Quantum Electronics, v.32,n.7,pp.1141–1149, 1996.

This document discloses a single loop optoelectronic oscillator. This oscillator contains a modulator, optical feedback loop, and photodetector. Although the intent of the authors is to generate a single tone by incorporating a narrow-band frequency filter in the loop, demonstration of multiple tones was achieved by enlarging the bandwidth of the filter. The frequency spacing of those multiple tones was set by injecting a sinusoidal electrical signal into the modulator, with the frequency of the injected signal equal to the spacing of the tones. This method causes all of the oscillator modes (one tone per mode) to oscillate in phase.

(3). Micro-ring resonators with absorption tuning for wavelength selective lightwave add/drop filtering—see the articles by S. T. Chu, B. E. Little, et al., IEEE Photonics Technol. Letters, Vol. 11,No. 6,pp. 691–693, 1999 and by B. E. Little, H. A. Haus, et al., IEEE Photonics Technol. Letters, Vol. 10,No. 6,pp. 816–818, 1998.

The Chu article provides experimental results verifying that a collection of micro-ring resonators can be used to separately filter a series of lightwave frequencies (or wavelengths). The second article provides an analysis that indicates the absorption, or loss, of the micro-ring resonator can be used to change the amount of light that is coupled into a micro-ring resonator and, thus, filtered.

(4). Optical add/drop filters based on distributed feedback resonators—see the papers by R. F. Kazarinov, C. H. Henry and N. A. Olsson, IEEE J. Quantum Electron. Vol. QE-23, No. 9,pp. 1419–1425, 1987 and by H. A. Haus and Y. Lai, J. Lightwave Technol., Vol. 10,No. 1,pp. 57–61, 1992.

This paper provides the design for another type of optical filter that can have RF bandwidths. The design provides for a filter bandwidth of 10 GHz. Even smaller bandwidths could be realized using currently available fabrication techniques. The authors do not discuss how to change the amount of light that is filtered.

(5). Optical add/drop filters based on Bragg gratings in interferometers—see the paper by F. Bilodeau, et al., IEEE Photonics Technol. Letters, Vol. 7,No. 4,pp. 388–390, 1995.

This paper describes the use of Bragg gratings in an optical-fiber interferometers configuration to accomplish the add/drop filtering. The authors do not discuss how to change the amount of light that is filtered. The filtering bandwidth of an optical Bragg grating is quite broad. A FWHM bandwidth of 25 GHz was reported for a Bragg grating of 1-cm length.

The waveform synthesizer disclosed herein includes a RF-lightwave frequency-comb generator that is coupled to a multi-tone, frequency selective amplitude modulator. The continuous-wave (CW) comb is a set of RF tones that are amplitude modulated onto a lightwave carrier. The amplitudes of these RF tones can be given different weights by the frequency-selective modulator, and the values of these weights can be changed. Since a waveform is described by its Fourier spectrum, which is the amplitudes of its constituent frequency components, changing the values of these amplitudes will change the waveform that results. The generator of the RF-lightwave frequency comb is preferably a photonic oscillator or, alternatively, a single loop opto-electronic oscillator or a tunable re-circulating comb generator, the latter two of which are known per se in the art. The amplitude weights are applied preferably by a set of wavelength or frequency selective optical reflectors or couplers.

The present invention makes use of a single-tone RF reference to synthesize a variety of wideband RF-lightwave and RF waveforms. The RF lightwave waveform can be carried on optical fiber or transmitted through free-space optical links. The RF waveform is constructed by demodulating the complete RF waveform from a lightwave carrier using a photodetector. The highest frequency component of the synthesized waveform can have a frequency that is substantially higher than that of the RF reference.

Agile wideband waveforms are especially useful for optical communication systems with multiple users and for secure optical links. For example, each user can be assigned a particular and unique pattern for the amplitudes of the tones in the waveform. A user can then distinguish its signal from other signals that occupy the same band of frequencies by coherently processing the received signal with a copy of the particular waveform pattern of that user. This type of Code Division Multiple Access (CDMA) for lightwave waveforms is different from prior art techniques. Prior techniques make use of short optical pulses, much shorter than the information pulse, whose wavelength and sequence of temporal locations can be different for each user. The waveforms synthesized by the approach of this invention also could be used for wideband RF communications systems and links.

Agile, wideband waveforms can serve as carrier waveforms for low-probability of intercept (LPI) radar systems. The capability for amplitude weighing of the individual tones of the frequency spread multi-tone waveform provides a significant enhancement over the invention described in the patent application entitled "Agile Spread Waveform Generator" which is discussed above.

BRIEF DESCRIPTION OF THE INVENTION

In one aspect, the present invention provides a waveform synthesizer comprising: a RF-lightwave frequency-comb generator; and a multi-tone, frequency selective amplitude modulator coupled to the RF-lightwave frequency-comb generator for generating a continuous-wave comb comprising a set of RF tones amplitude modulated onto a lightwave carrier.

In another aspect, the present invention provides a method of synthesizing a RF-modulated lightwave waveform as well as a corresponding RF waveform, the method comprising the steps of: generating component frequencies of the waveform in the lightwave domain; adjusting the amplitudes of those components in the lightwave domain; and generating a RF waveform by photodetecting the modulated lightwave waveform.

DESCRIPTION OF THE DRAWINGS

FIGS. 6(a) and 6(b) illustrates two embodiments of a multi-tone amplitude modulator which are based on circular microresonators having electrically controlled optical absorption; and FIGS. 7(a) and 7(b) illustrates two additional embodiments of a multi-tone amplitude modulator, these embodiments being based on distributed-feedback optical resonators with electrically controlled optical leakage or pass through.

DETAILED DESCRIPTION

This invention presents an approach for synthesizing RF lightwave waveforms in the optical domain. These waveforms are constructed by generating their constituent Fourier frequency components or tones and then adjusting the amplitudes of those frequency components or tones. A RF waveform can be produced from the RF-lightwave waveform by photodetection. Furthermore, a frequency-shifted RF waveform can be produced by heterodyne detection for which a second, single-tone lightwave signal with the proper wavelength offset also is supplied to a photodetector. See also the related U.S. patent provisional application Ser. No. 60/332,372 and filed Nov. 15, 2001, and its corresponding non-provisional application bearing Ser. No. 10/116,829 filed on the same date as the present 236 application, both of which are entitled "Agile Spread Waveform Generator" and both of which are mentioned above.

A time-varying waveform can be described in terms of its Fourier spectrum. This spectrum consists of various frequency tones with each tone having some specific amplitude. Typically, a waveform is generated by some means and it is characterized by examining its Fourier spectrum with an electronic or optical spectrum analyzer. However, if there is some way to generate the various frequency tones that comprise a waveform and to give those tones the desired amplitudes, the waveform itself can be synthesized. This invention provides a way to do such synthesis of waveforms in the optical domain.

Figure 1:
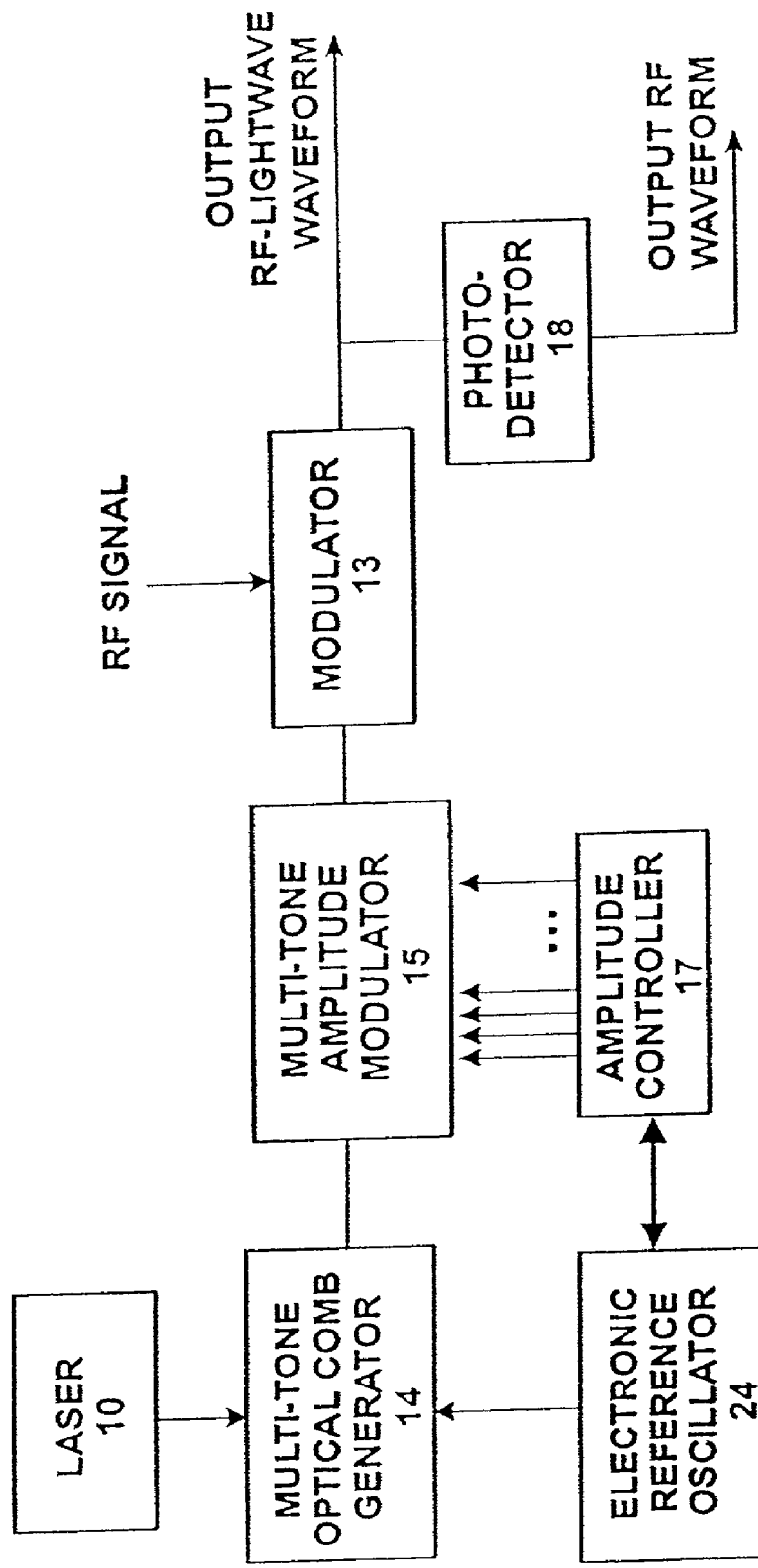
FIG. 1 is a block diagram illustrating one embodiment of an agile waveform synthesizer, which can produce both RF-lightwave and RF waveforms.

One embodiment of the waveform synthesizer of this invention is illustrated by the block diagram of FIG. 1. This synthesizer includes a lightwave source, such as laser 10, an optical comb generator 14, and a multi-tone amplitude modulator 15. Light from the laser 10 is preferably in the form of a single tone (single wavelength), which can be considered as a lightwave carrier. This carrier is supplied to the optical comb generator or oscillator 14. The comb generator/oscillator 14 produces a set of additional tones that are amplitude-modulated onto the lightwave carrier. These tones have some fixed amplitude distribution that is determined by the comb generator 14. The multi-tone lightwave waveform is then supplied to the multi-tone amplitude modulator 15. This modulator can adjust the amplitude of each tone individually, to match the amplitude profile of the desired waveform. The output of the amplitude modulator 15 is the RF-lightwave waveform. This RF-lightwave waveform can serve as an encoded carrier onto which a RF signal is modulated by an optical modulator 13. The RF signal can be a polyphase code or a pulse code, for example. The RF-lightwave waveform also can be directed to a photodetector 18. The output of the photodetector 18 is a RF version of the synthesized waveform, with the original lightwave carrier (supplied by the laser) removed and the two amplitude-modulation sidebands combined. An electronic reference oscillator 24 can be optionally included in the synthesizer to help control the frequency spacing of the comb. In addition, an amplitude controller circuit 17 can be included to adjust, in real time, the amplitudes of the individual tones, thereby permitting the RF-lightwave waveform to change its shape.

The encoded carrier generated by the apparatus of FIG. 1 may be utilized, for example, in connection with CDMA based communication systems. Each user or community channel of the CDMA based communication system is assigned a particular carrier comprised of multiple tones of specific amplitudes. By using the disclosed synthesizer to produce unique combinations of amplitudes for those tones, each carrier can be made unique. In a communication system, a waveform synthesizer is located at or near the transmitted unit and a complimentary waveform synthesizer is located with the receiving unit. Both synthesizers are set to produce the same amplitude modulated pattern for the tones. In general, the frequency spacing of the multiple tones comprising the synthesized waveform is larger than the maximum frequency content of the RF signal modulated onto modulator 13. The encoded carrier generated by the embodiments yet to be discussed can also be utilized for the same purposes.

Figure 2:
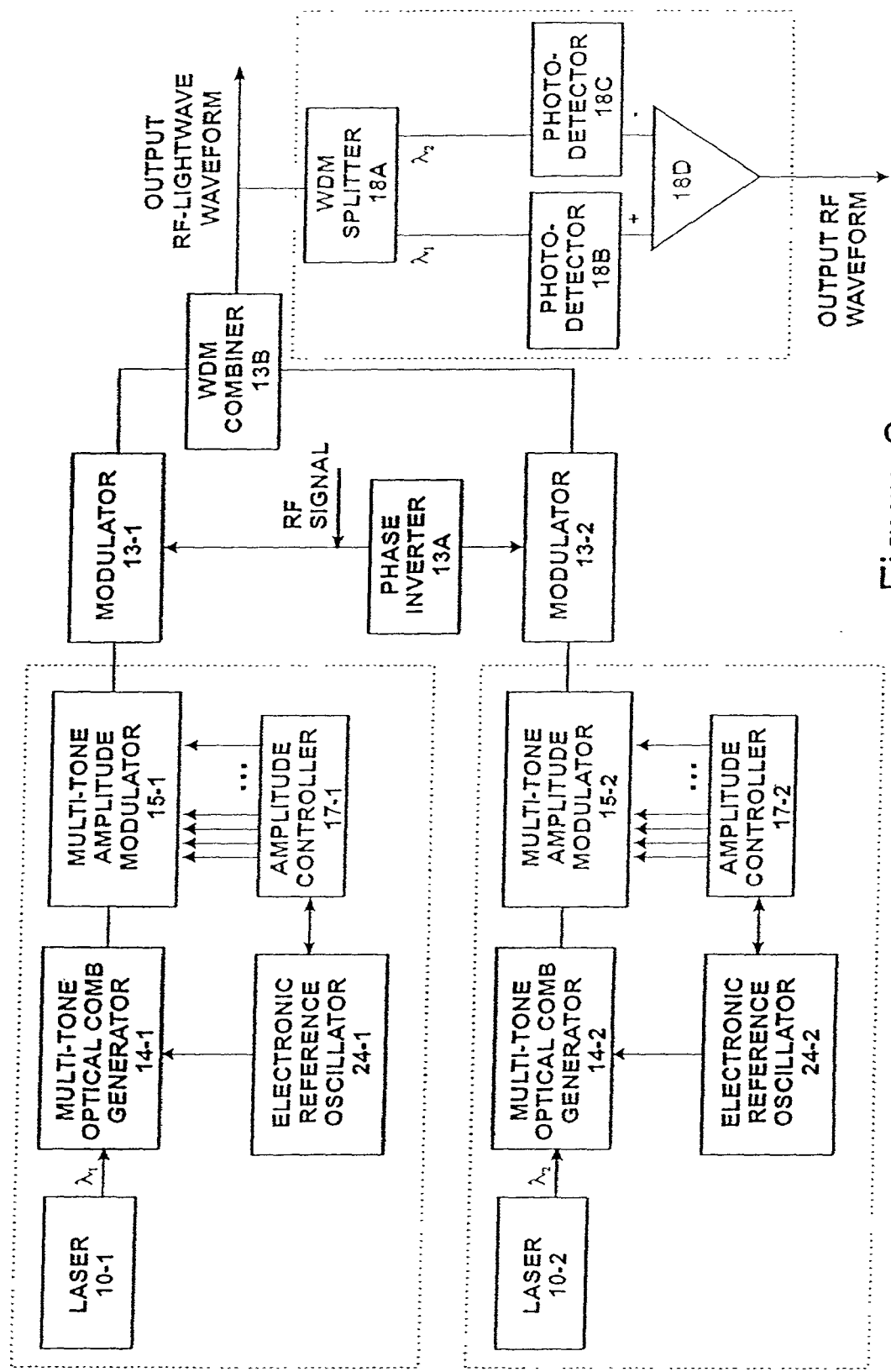
FIG. 2 is a block diagram which bears some resemblance to FIG. 1 with the synthesizer thereof being modified, in this embodiment, to accommodate both positive and negative coefficients.

The waveform synthesizer of FIG. 1 adjusts the amplitude of each tone according to coefficients so long as the coefficients have a common sign (plus or minus). FIG. 2 is a more versatile embodiment of the waveform synthesizer that can accommodate both positive and negative coefficient values. In FIG. 2 the laser 10, comb generator 14, the reference oscillator 24, the amplitude controller 17, the multi-tone amplitude modulator 15 and the modulator 13 appear twice with either a -1 or a -2 being added to the element numerals. The -1 elements are associated with laser 10-1 which outputs laser light at a frequency $\lambda_1$ while the -2 elements are associated with laser 10-2 which outputs laser light at a frequency $\lambda_2$. The modulators 13-1 and 13-2 both receive the RF signal, but in comparatively phase inverted forms. The phase inversion is accomplished, in this embodiment, by utilizing a phase invertor 13A in the signal path to one of the two modulators, modulator 13-2. The modulated outputs of the modulators 13-1 and 13-2 are combined by a wavelength division multiplexing (WDM) combiner 13B. The output of the combiner 13B provides a lightwave version of output waveform. In order to provide an electrical version thereof, a WDM splitter 18A splits the lightwave signal back up into its $\lambda_1$ and $\lambda_2$ components that are separately photodetected by detectors 18B and 18C, respectively. The outputs of detectors 18B and 18C are combined by a differential adder/amplifier 18D. The output of element 18D is the electrical version of the RF waveform output.

Figure 3:
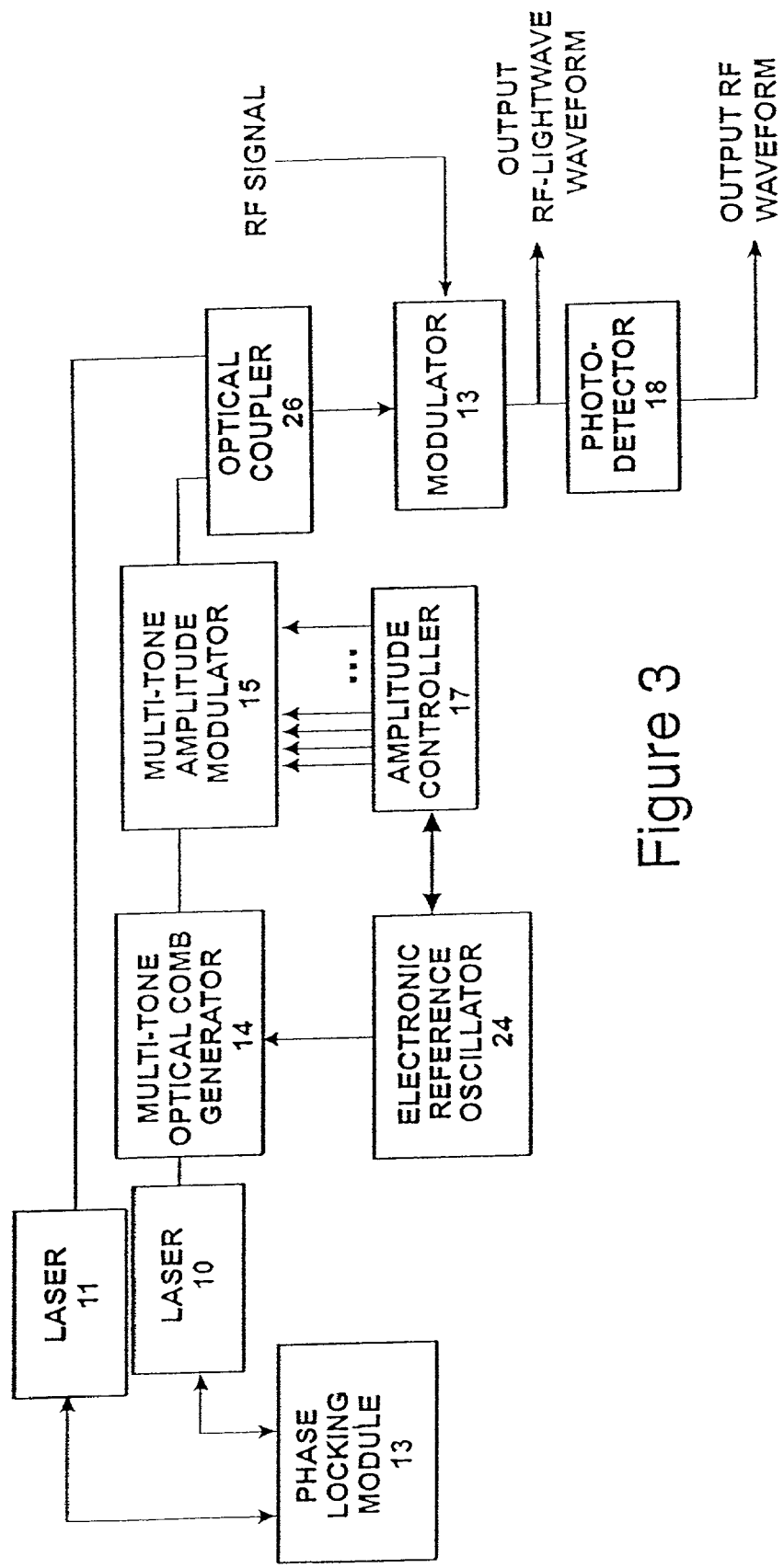
FIG. 3 is a block diagram illustrating a second embodiment of an agile waveform synthesizer, which can produce a heterodyne RF-lightwave waveform, and a frequency translated RF waveform.

Another variation of the waveform synthesizer of FIG. 1 is illustrated by FIG. 3. This variation synthesizes a dual-line-carrier RF-lightwave waveform and a frequency-translated RF waveform. A second lightwave source, such as another single-tone laser 11, is added to the synthesizer of FIG. 1. This second laser 11 produces a reference lightwave carrier whose wavelength is offset from the wavelength of the first laser 10. The wavelength difference (or offset) can be considered as a local-oscillator frequency. Both the comb-modulated carrier (of the first laser 10) and the reference carrier (of the second laser 11) impinge upon a square-law photodetector 18. The photodetector 18 produces an electrical signal that is the heterodyne combination of both incident RF-lightwave signals. This electrical signal is translated in frequency by an amount equal to the wavelength offset of the two lasers 10, 11. The process of heterodyning, outlined above, is well known. In order for the heterodyne to be stable, the two lasers must be phase locked. A phase locking module 13 is preferably provided to perform this function. Various methods known in the art can be used to achieve the phase locking. These methods include optical injection locking of the two lasers (the slave lasers) to: (1) different modes of a mode-locked master laser, (2) modulation sidebands of a frequency or phase modulated master laser, or (3) different phase-locked modes of an optical comb generator. Another method makes use of a phase-lock loop that takes the heterodyne output of the two lasers, before they are modulated by the comb, and compares that output with an external RF reference in a RF phase detector to produce an error signal for correcting the wavelengths of the lasers. In all these methods, a highly stable and low phase-noise RF reference oscillator is used to externally lock the mode locked laser or the optical comb generator, to provide the modulation sidebands in the phase modulated laser, or to provide a reference for the phase-lock loop. Both the heterodyning process and the methods for producing phase-locked lasers are discussed in more detail in the patent application entitled "Agile Spread Waveform Generator" discussed above.

The embodiment of FIG. 3 can be further modified to accommodate both positive and negative coefficient values. This would be done by making the same sort of modification done in the embodiment of FIG. 2 relative to FIG. 1 to FIG. 3 instead. This would involve providing -1 and -2 version of elements 10, 11, 13, 14, 15, 17, 24 and 26 (corresponding to frequencies $\lambda_1$ and $\lambda_2$) and with the outputs of the -1 and -2 versions of the modulators 13 being applied to the input of the WDM combiner 13B as previously discussed with respect to FIG. 2.

Figure 4:
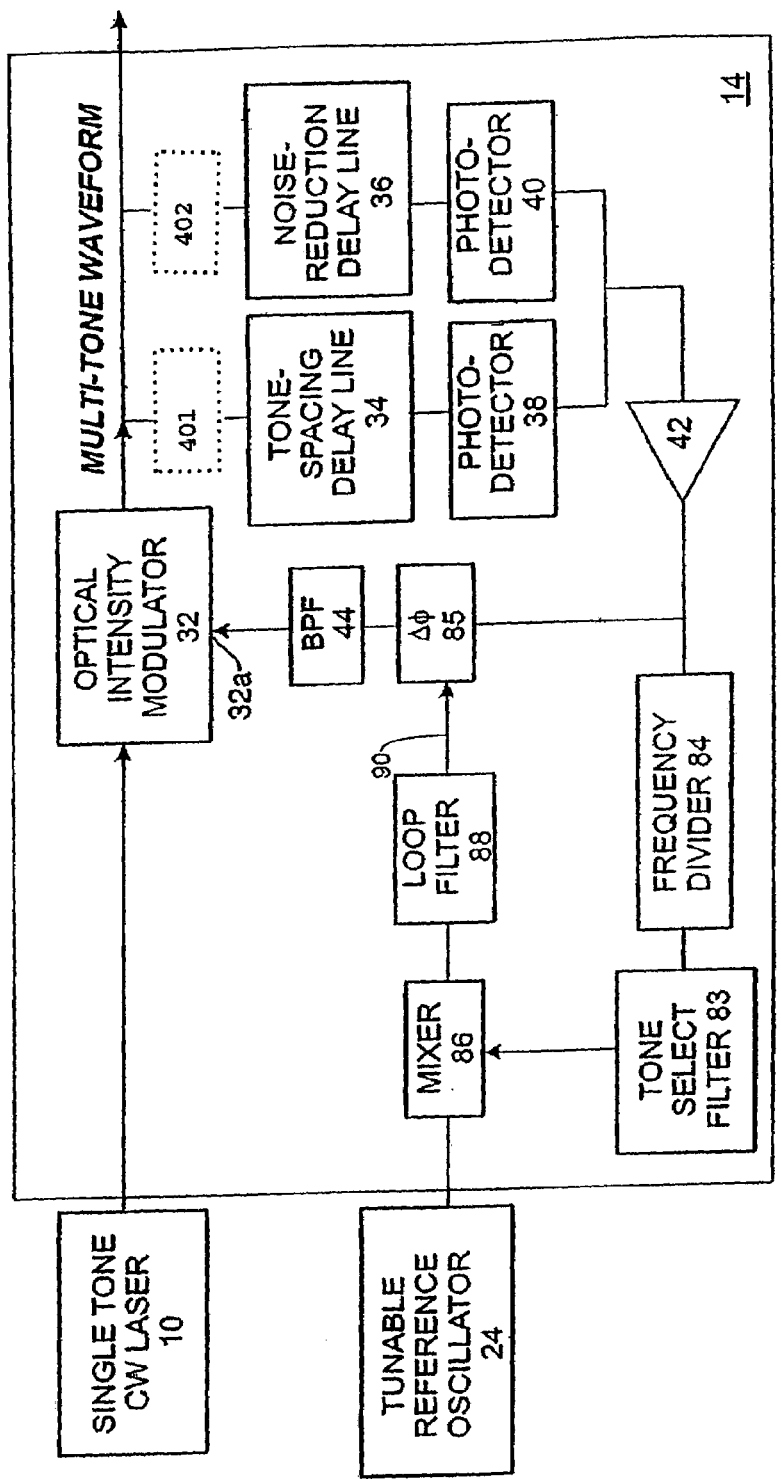
FIG. 4 is a block diagram illustrating one embodiment of a tunable, multi-tone, optical comb generator.

The multi-tone comb generator 14 can be implemented using a variety of known devices. Two of these devices are a single loop, electrically injection-locked optoelectronic oscillator and a re-circulating optical-comb generator, both of which devices are known per se in the prior art. The preferred comb generator 14 is a multi-loop, multi-tone photonic oscillator, one embodiment of which is depicted by FIG. 4. A photonic oscillator is expected to produce tones that have lower phase noise than the re-circulating comb generator. Moreover, the tones produced by this photonic oscillator need not be mutually coherent and, thus, those tones can be combined at the photodetector 18, as is shown in FIG. 3, without the generation of additional beat tones. However, in some cases, it may be desirable to generate tones that are phase locked to each other. A series of pulses is thereby produced rather than a continuous-wave (CW) waveform. In those cases a re-circulating comb generator or the single loop, electrical injection-locked optoelectronic oscillator mentioned in the prior art documents noted above could be used as the multi-tone comb generator 14.

An improved version of a multi-loop, multi-tone photonic comb generator or oscillator is illustrated by FIG. 4. This embodiment of a photonic comb generator or oscillator 14 includes an optical intensity modulator 32, lightwave delay paths 34 and 36, two photodetectors 38 and 40, a low-noise electrical amplifier 42, an electrical phase shifter 85 and a RF bandpass filter 44. Light from the laser 10, which supplies power for this oscillator, is modulated by a RF signal at an electrical input 32a of the modulator 32. The modulated lightwave is then split into two branches, one connected to a shorter optical delay path 34, and the other to a longer optical delay path 36. The RF-lightwave signals in the two optical paths 34 and 36 are photodetected by photodetectors 30 and 40 and then combined. The electrical outputs of the photodetectors are combined and preferably amplified by an amplifier 42 and bandpass filtered by a filter 44 and then fed back to the modulator, as shown in FIG. 4. The bandpass filter 44 sets the RF bandwidth of the generated RF multi-tone comb spectrum. Random noise generated in the feedback loops modulates the laser light, which after propagating through the two optical delay paths and being photodetected is regeneratively fed back to the modulator. Potential oscillation modes exist at frequency intervals that are an integer multiple of the inverse of the delay times of the two loops ($\tau_S$ and $\tau_L$), where $\tau_S$ is the delay time of the shorter loop and $\tau_L$ is the longer loop's delay time. However, oscillation will only occur at frequencies where the modes resulting from both delay loops overlap if the sum of the open loop gains of both feedback loops is greater than one and the open loop gains of each feedback loop is less than one. Therefore, oscillation will only occur at modes spaced at the frequency interval determined by the shorter loop ($\Delta f = k/\tau_S$). On the other hand, the oscillator phase noise $S(f')$ decreases quadratically with the optical delay time in the longer loop: $S(f') = \rho/[(2\pi)^2(\tau_L f')^2]$, where $\rho$ is the input noise-to-signal ratio and $f'$ is the offset frequency. Combining these two effects results in a multi-tone, multi-loop photonic oscillator in which the tone spacing and phase noise can be controlled independently. Additional discussion of this photonic oscillator is provided in the provisional and non-provisional patent applications entitled "Agile Spread Waveform Generator" referenced above. Instead of using an electronic amplifier 42 in the electronic portion of the loops, an optical amplifier 401 or 402 can be used in the optical portion of the loops.

The device shown in FIG. 4 contains a means for tuning the frequencies of the RF tones. As shown in FIG. 4, an electronic phase shifter 85 is added in the feedback loop of this embodiment of the generator/oscillator 14 for tuning the frequencies of the RF tones generated thereby. A frequency divider 84 and a tone-select filter 83 selects one tone of the comb to compare with a tunable external reference 24. An electronic mixer 86 acts as a phase detector the output of which is filtered by a filter 88 to produce an error signal 90 used to control the phase shifter 85. Note that changing the phase of the phase shifter 85 changes the phase delay incurred by propagation through both the shorter and longer feedback loops of the oscillator. This type of phase-lock loop control is known per se in the art. The precise frequency and frequency spacing of the oscillator tones is changed, therefore, by changing the frequency of the external reference 24. The rate with which the external reference frequency is tuned should be slower than the response time of the frequency-stabilization loop. The maximum amount of frequency tuning is limited by the phase excursion of the phase shifter 85. This phase-lock loop also is effective in stabilizing the oscillation frequencies against environmental perturbations that can change the lengths of the delay lines 34, 36 and propagation delays of the oscillator-feedback loops and thereby cause the frequencies of the RF tones generated by generator 14 to drift. Use of a phase-lock loop for frequency stabilization of a photonic oscillator is known per se in the art. However, such loops have not been used before to deliberately tune the frequencies of the RF tones generated by a photonic oscillator.

Figure 5:
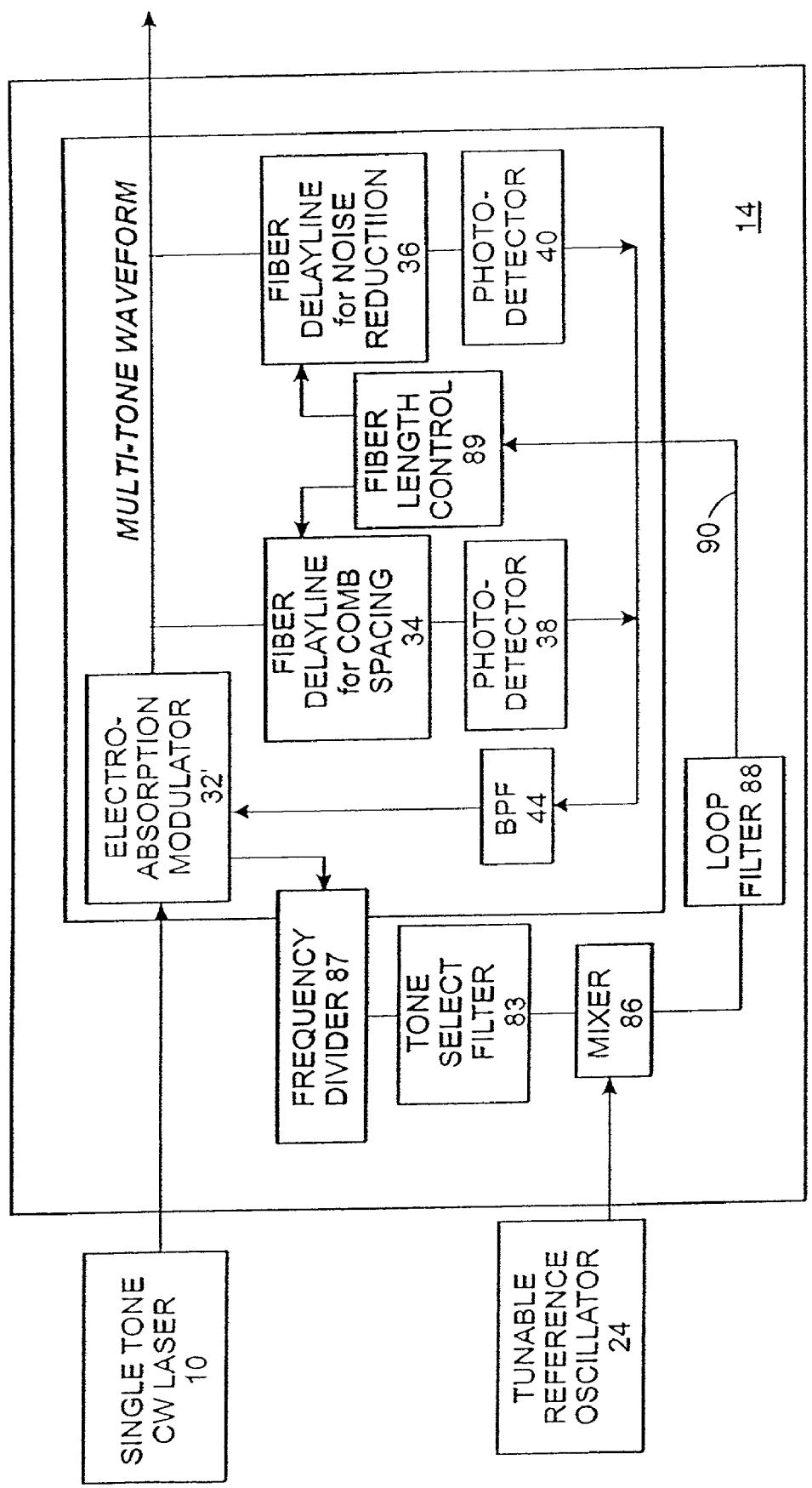
FIG. 5 is a block diagram illustrating a second embodiment of a tunable, multi-tone, optical comb generator.

A second approach for controlling the tone spacing and the frequencies of the tones is shown in FIG. 5. In this case, the optical intensity modulator is an electro-absorption modulator 32', which is known per se in the art. The electro-absorption modulator 32' also acts as a photodetector and produces an electrical version of the RF comb in addition to an optical version of the comb which is supplied to the delay lines. The electrical output of modulator 32' is frequency-divided by a divider 87, filtered by a filter 83 and phase-detected by a mixer 86 to produce an error signal 90 at the output of loop filter 88. The error signal 90 is used to adjust separately the physical lengths of the two optical-fiber delay lines in the two loops 34 and 36 by a fiber length control 89 and thereby tune the frequencies of the tones. Alternatively, one detector can be used instead of two detectors 38, 40. See U.S. provisional patent application serial No. 60/332,372 filed on Nov. 15, 2001 and its corresponding non-provisional application bearing Ser. No. 10/116,829 filed on the same date as the present application, both entitled "Agile Spread Waveform Generator", both of which are mentioned above, for additional details in this regard (the single detector appear at element 39 in FIG. 10 thereof). This frequency-control approach also can be used to stabilize the tone spacing and the precise frequencies of the tones against environmental perturbations. In this case, the error signal 90 is used to compensate for changes in the physical lengths or refractive indices of the loops 34, 36 produced by environmental perturbations. Note that the phase delays of the two optical feedback loops can be controlled separately. Thus, this approach is less dependent on the frequency pulling capability of the two coupled oscillator loops.

A multi-tone amplitude modulator 15 is used in the agile waveform synthesizers of FIGS. 1 and 2. Multiple variations of this modulator 15 are described herein. These variations are based, however, on known techniques that have been developed previously for add/drop filtering with the frequency resolution appropriate for dense-wavelength-division multiplexing (DWDM) applications. Generally, a frequency resolution of 50–200 GHz is needed for DWDM applications. In contrast, for the RF-lightwave waveform synthesizer, a frequency resolution on the order of 0.1–10 GHz is preferred.

Two embodiments of the multi-tone amplitude modulator 15 are illustrated by FIGS. 6(a) and 6(b). These modulators 15 have some similarity to the micro-ring resonators described in prior art document (3) identified above. The present modulator 15 contains an optical waveguide trunk 100 that is coupled optically to multiple circular microresonators 102. Each microresonator 102 has a slightly different diameter. One or more electrical control lines 104 are supplied to each of the microresonators 102. The control signals on these lines 104 adjust the optical refractive index and/or the optical absorption of the associated microresonator 102. If laser or electro-absorption structures are used, the single control line 104 to each structure will control both frequency and amplitude. Optional outlet waveguide segments 106 can be optically coupled to each of the microresonators 102. Light incident on the optical waveguide trunk 100 is in the form of multiple RF tones ($f_1, f_2, f_3, f_4, \ldots$) that are amplitude modulated onto a single-wavelength lightwave carrier. Each tone has a specific lightwave frequency and generally both upper and lower amplitude-modulation sidebands would be represented in the comb. Light exiting the optical waveguide trunk is comprised of the same tones but the amplitudes of those tones have been adjusted by different weights (a, b, c, d, ... ). These weighing factors a, b, c, d, ... are all less than or equal to unity unless the resonator has gain, in which case the weighing factors a, b, c, d, ... are less than, equal to or greater than unity.

Optical coupling between the trunk 100 and the microresonators 102 is generally by means of the evanescent fields of the optical modes. The optical guided modes of the trunk 100 and the microresonators 102 overlap and can exchange energy. This coupling mechanism is well known in the art. The relevant modes of the microresonator propagate along the perimeter of the circular structure. For a solid microresonator 102, these modes are known as whispering-gallery modes. Each microresonator 102 has a slightly different diameter and thus a different resonant optical wavelength. One microresonator 102 is matched to each of the tones in the comb. Coupling into the microresonators 102 is enhanced at the resonant wavelengths. Each microresonator 102 has multiple resonate wavelengths whose spacing is the free-spectral range of the resonator. In practice, the resonators 102 can be designed so that the free-spectral range (FSR) is larger than the total bandwidth of the input RF-lightwave comb. The FSR of a circular microresonator is equal to $c/\pi n_e d$, where c is the speed of light, $n_e$ is the optical refractive index of the propagating mode (the effective index), and d is the diameter of the resonator. For example, a diameter of 0.3 mm would result in a FSR of approximately 100 GHz, for an effective index of 3.2. These are representative values for a multi-tone amplitude modulator fabricated from waveguide structures in typical electro-optic materials such as GaAs or InP. Note that a change in the resonant wavelength of 1 GHz can be accomplished by a micrometer-sized change in the diameter of the resonator. Such dimensional control is well within the capabilities of current photolithographic processes.

The microresonator 102 is preferably fabricated from an electro-absorptive material, such as GaAs or InP based semiconductors (see the embodiment of FIG. 6(a)) or an electro-optic material such as Lithium Niobate (see the embodiment of FIG. 6(b)). The waveguide trunk 100, however, may be fabricated from either an electro-optic material or a non-electro-optic dielectric (such as silica). By fabricating the microresonator 102 from an electro-optic material, one can electrically modify the effective index of the resonator mode and thus the resonant frequency. Such modification can be employed to compensate for fabrication inaccuracies. It also can be used to tune the resonant frequency in cooperation with the frequency tuning of the optical comb generator (discussed above). A maximum change in the refractive index of 1–5% is typical for electro-optic tuning.

In the embodiment of FIG. 6(a), the optical absorption can be adjusted by applying a bias voltage on lines 104 across a PIN diode structure constructed from the GaAs or InP based semiconductor material. The optical absorption can be changed to control the amount of optical power that is coupled from the waveguide trunk 100 into the resonator 102. As the resonator absorption is increased, the amount of light that remains in the trunk 100 and bypasses the resonator 102 also increases. The use of absorption changes to modify the resonator-trunk coupling is discussed in the references for prior art document number 3 identified above. In one example (see prior art document (3)), a change in absorption of 20 dB resulted in a change in throughput power of 10 dB. The filter bandwidth of the resonator-trunk combination is dependent to some extent on the optical power lost to the resonator. Since each resonator modifies the amplitude of only a single tone, pass band shape is not critical so long as the filter gain/phase remains approximately the same at the frequency of the tone being modulated by the filter.

In the embodiment of FIG. 6(b), an optical directional coupler 105 is used with each microresonator 102 to adjust the coupling and the control voltages on lines 104 are applied to this coupler 105. Lines 107 can be used to control the frequency at which the microresonators function.

To learn more about fabrication techniques for multi-tone amplitude modulators the reader is directed to the prior art documents referred to above and to a provisional patent application identified above, entitled "Waveguide-Bonded Optoelectronic Devices" bearing Ser. No. 60/332,370 and filed Nov. 15, 2001,and its corresponding non-provisional application bearing Ser. No. 10/116,800 and filed on the same date as the present application.

Figure 7A:
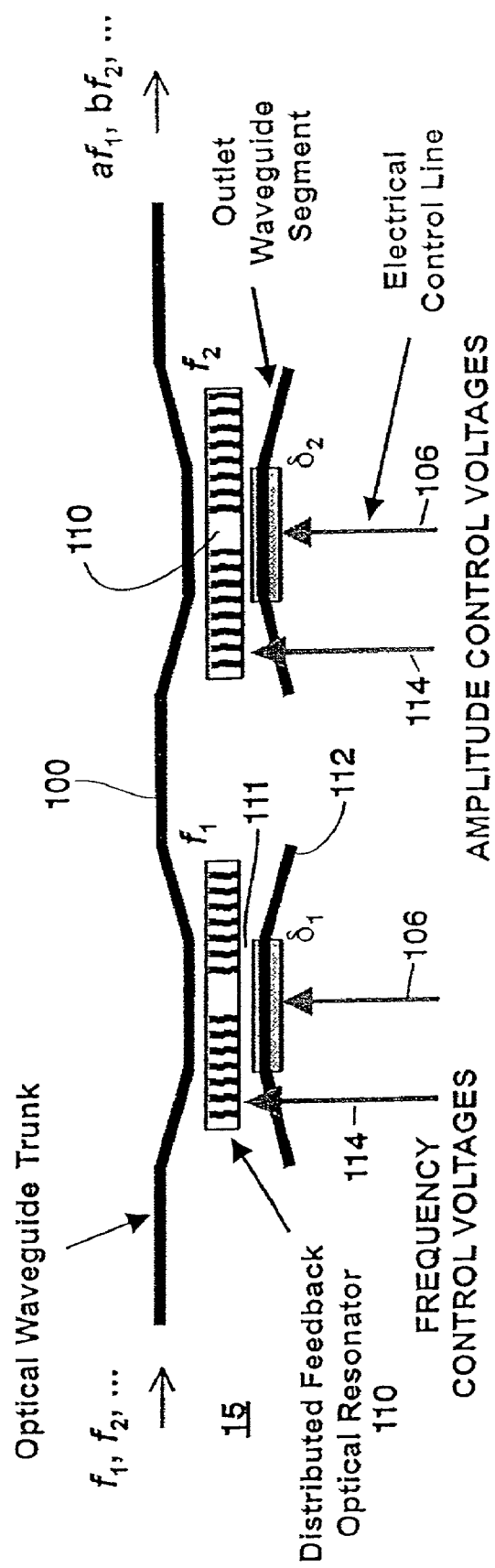
Figure 7B:
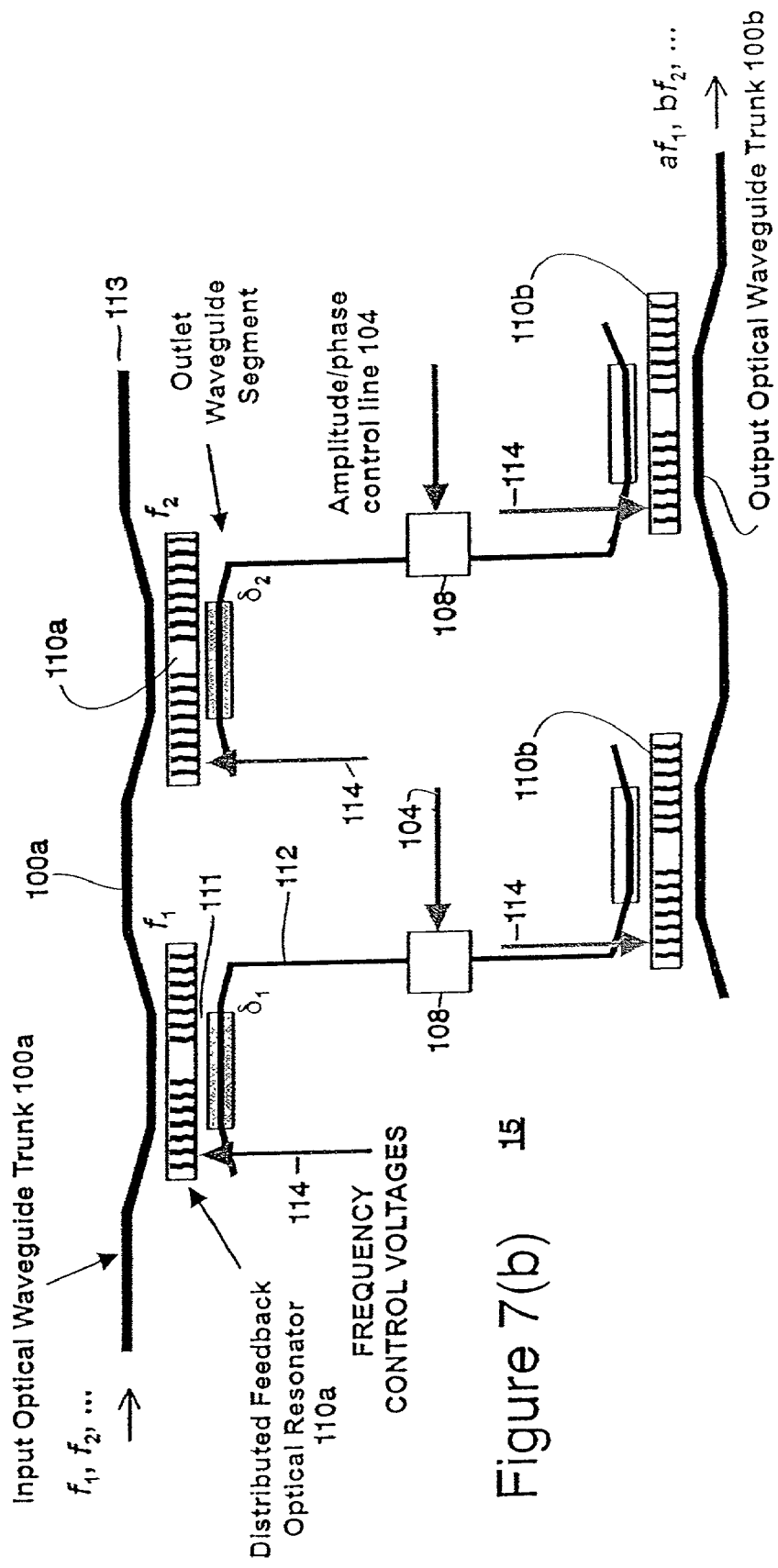

Two additional embodiments of the multi-tone amplitude modulator 15 are illustrated by FIGS. 7(a) and 7(b). This modulator 15 is based on the add/drop filters constructed from distributed-feedback optical resonators of prior art reference number (4) identified above. The modulator 15 includes a waveguide trunk 100 that carries the RF-lightwave comb. The trunk 100 is coupled to multiple taps 110, with each tap 110 being a distributed-feedback optical resonator 110. Each distributed-feedback optical resonator 110 is resonant at a particular optical wavelength and selects a specific tone of the comb. Each optical resonator 110 also is coupled to an outlet waveguide segment 112. The outlet waveguides 112 in combination with their associated optical resonators 110 provides a controllable means for light coupled from the trunk 100 to be leaked away. Electrical control signals on lines 114 control the effective index of the resonator mode (and thus the resonant frequency) while electrical signals on lines 106 control the optical coupling coefficient between the resonator 110 and the outlet waveguide 112. Both the resonator and the outlet waveguide are preferably constructed from electro-optic materials (such as GaAs or InP based semiconductors or Lithium Niobate). Use of electro-optic materials permits the effective indices of the modes to be modified electrically.

Narrow resonator linewidths can be achieved by using weak coupling between the trunk 100 and the resonators 110. Also, narrow linewidths are achieved by having strong distributed feedback, leading to shorter resonators compared to the transfer length for the coupling. For linewidths on the order of 1 GHz, the desired transfer length for coupling between the trunk 100 and the resonator is on the order of 10 mm. Note that the linewidth achieved with a distributed-feedback optical resonator is much smaller than the linewidth that is possible when only the distributed reflection is employed (such as in prior art reference number (5) identified above). This improvement is on the order of the ratio between the coupling strength and the square of the distributed feedback efficiency.

The disclosed multi-tone amplitude modulator 15 of FIG. 7(a) provides a means to electrically control the amount of coupling from a distributed-feedback optical resonator 110 to its outlet waveguide 112. This control is achieved by applying a voltage across the gap 111 between the optical resonator 110 and the outlet waveguide 112. The applied voltage changes the optical refractive index of the material in the gap and thus the shapes of the evanescent optical fields in that gap. Alternatively, a voltage can be applied just to the outlet waveguide 106 to change its refractive index. Note that one can permit the wavelength linewidth for the coupling between a resonator 110 and its outlet waveguide 112 to be larger than the linewidth for the coupling between that resonator and the trunk 100. The latter linewidth determines the wavelength selectivity of the tap. As the coupling strength between a resonator and its outlet is changed (by means of the control voltage on lines 106), the amount of energy leaked from that resonator 110 is changed. In terms of the coupling between the resonator 110 and the trunk 100, this leakage out of the distributed-feedback resonator 112 acts in the same way as the absorption of light within the circular microresonators 102 of the embodiment of FIG. 6(a).

The amount of light coupling to the outlet waveguide segments 112 is signified by the letters $\delta_1, \delta_2, \ldots$ in FIGS. 7(a) and 7(b).

The embodiment of FIG. 7(b) is rather similar to the embodiment of FIG. 7(a) except that the resonators 110 are used for coupling to segments 112, not for the purpose of the leaking out or trapping out the undesired portions of the optical signals on trunk 100 (as in the case of the embodiment of FIG. 7(a)), but rather for the purpose of collecting the desired portions from an input trunk 100a and communicating them to an outlet trunk 100b via resonator pairs 110a and 110b. Resonators 110a and associated with the input trunk 110a while resonators 110b are associated with the output trunk 110b. The outlet waveguides 112 in combination with their associated optical resonators 110a provide a frequency selective controllable means to couple light from trunk 100a to trunk 100b.

Amplitude/phase control voltages are applied on lines 104 which are coupled to amplitude/phase control devices 108. These devices 108 can be implemented using liquid crystal spatial modulators. Frequency control voltages are applied on lines 114 that control resonators 110a and 110b. If the input resonators 110a are identical to the output resonators 110b, then for an associated pair of resonators (in this embodiment each input resonator is associated with an output resonator with which it is coupled by means of an amplitude/phase control device 108, there being an associated pair of resonators 110a, 110b for each RF tone $f_n$ in the waveguide trunk 100a) their control lines 114 may be connected to a common source.

To summarize, this invention consists of new constructs that perform synthesis of RF-lightwave waveforms and RF waveforms. The synthesis approach generates a comb of tones, controls the frequencies of those tones and controls the amplitudes of those tones. Two key components of the construction are based on prior art but add new features to the prior art. For example, the prior-art optical comb generators have been adapted to have the capability for real-time controlling and tuning of the specific frequencies in the multi-tone RF-lightwave waveform. For another example, the frequency selective amplitude modulators of this invention are based on prior art on optical add/drop filters for DWDM. This disclosure has discussed means for adapting these prior approaches to the task of selecting the individual tones of a RF-lightwave comb, which have much smaller frequency spacing than the DWDM channels. This application also has disclosed means to incorporate real-time electrical control of the gain or throughput of the filtering elements. By modifying the gain of these frequency-selective taps, one modifies the amplitudes of their associated frequency tones. Such deliberate gain control was not needed for the DWDM filters and was not a part of the prior art.

A number of embodiments of the invention have been disclosed and it is likely that modification will now suggest itself to those skilled in the art. As such, the invention is not to be limited to the disclosed embodiments except as specifically required by the following claims.

What is claimed is:

1. A waveform synthesizer comprising:
   (a) a RF-lightwave frequency-comb generator for generating a continuous wave comb comprising a set of RE tones modulated onto a lightwave carrier, said set of RF tones comprising multiple upper and lower modulation sideband pairs, the RF-lightwave frequency-comb generator comprising multiple loops each having an optical delay line, the optical delay lines in the different loops having different lengths, at least one photodetector, and an optical intensity modulator, the optical delay lines receiving an optical output of the optical intensity modulator, the output of the optical intensity modulator also being supplied to the multi-tone, frequency selective modulator, the outputs of the optical delay lines being detected by said at least one photodetector, the output of the detector being coupled to the optical intensity modulator, wherein spacing between RF tones in said set of RF tones is determined by a delay through a shortest of the optical delay lines;
   (b) a multi-tone, frequency selective modulator coupled to the RF-lightwave frequency-comb generator and configured to produce a modulated RF-lightwave frequency comb; and
   (c) a photodetector for producing a synthesized RE waveform from said lightwave carrier and said multiple upper and lower modulation sideband pairs in said modulated RF-lightwave frequency comb.

2. The waveform synthesizer of claim 1 wherein the amplitudes of the RF tones are given different weights by the frequency selective modulator and wherein values of said weights are changeable.

3. The waveform synthesizer of claim 1 wherein the generator of the RF-lightwave frequency comb comprises a photonic oscillator.

4. The waveform synthesizer of claim 1 wherein the multi-tone, frequency selective modulator is coupled to receive the output of the RF-lightwave frequency-comb generator by a waveguide and wherein the frequency selective modulator includes a set of frequency selective optical reflectors or couplers which interact with said waveguide.

5. The waveform synthesizer of claim 4 wherein said set of frequency selective optical reflectors or couplers which interact with said waveguide include an outlet waveguide segment for conducting light away from said waveguide.

6. The waveform synthesizer of claim 4 wherein said set of frequency selective optical reflectors or couplers which interact with said waveguide include a set of circular-shaped resonators each having a different diameter and a corresponding different resonant optical frequency which corresponds to a tone in said set of RF tones.

7. The waveform synthesizer of claim 4 wherein said set of frequency selective optical reflectors or couplers which interact with said waveguide include a set of distributed-feedback resonators each having a different resonant optical frequency corresponding to a tone in said set of RF tones.

8. The waveform synthesizer of claim 4 wherein said set of frequency selective optical reflectors or couplers which interact with said waveguide include a set of circular-shaped resonators each having a frequency control input for receiving a control signal, the control signals delivered to said set of frequency selective optical reflectors or couplers causing each of said frequency selective optical reflectors or couplers to assume a corresponding different resonant optical frequency which corresponds to a tone in said set of RF tones.

9. The waveform synthesizer of claim 4 wherein said set of frequency selective optical reflectors or couplers which interact with said waveguide include a set of distributed-feedback resonators each having a frequency control input for receiving a control signal, the control signals delivered to said set of distributed-feedback resonators causing each of said distributed-feedback resonators to assume a corresponding different resonant optical frequency which corresponds to a tone in said set of RF tones.

10. The waveform synthesizer of claim 1 wherein the multi-tone, frequency selective modulator is coupled to receive the output of the RF-lightwave frequency-comb generator by an input waveguide and further including an output waveguide coupled to the input waveguide by associated pairs of resonators, one resonator in each of said associated pairs of resonators coupling light from said input waveguide and the other resonator in each of said associated pairs of resonators coupling light into said output waveguide.

11. The waveform synthesizer of claim 10 wherein each associated pair of resonators is coupled to a modulator for modulating the amplitude and/or phase of light coupled from the input waveguide to the output waveguide.

12. The waveform synthesizer of claim 1 wherein the at least one photodetector comprises multiple photodetectors with one photodetector in each loop.

13. The waveform synthesizer of claim 1 wherein the RF-lightwave frequency-comb generator comprises multiple loops including:
  (i) a first optical delay line in a first loop for spacing a comb generated by the a multi-tone optical comb generator;
  (ii) a second optical delay in a second loop line for noise reduction, the second delay line being longer than the first optical delay line;
  (iii) at least one photodetector connected to the first and second delay lines; and
  (iv) an optical intensity modulator in a loop portion common to the first and second loops for driving the first and second optical delay lines.

14. The waveform synthesizer of claim 13 wherein the loop common portion further includes an amplifier and a band pass filter.

15. The waveform synthesizer of claim 14 wherein the amplifier is an electronic amplifier.

16. The waveform synthesizer of claim 13 wherein the loop common portion further includes a band pass filter and wherein at least one of the first and second loops includes an optical amplifier therein.

17. The waveform synthesizer of claim 13 further including means for compensating for environmental changes affecting a length of at least one of the first and second optical delay lines.

18. The waveform synthesizer of claim 17 wherein the means for compensating for environmental changes affecting the length of at least one of the first and second optical delay lines comprises an apparatus for adjusting the length of at least one of the first and second optical delay lines and a feedback circuit including a tone selection filter coupled to the loop common portion and a mixer for mixing the output of the tone selection filter with a reference signal, an output of the mixer being operatively coupled to the length adjusting apparatus.

19. The waveform synthesizer of claim 18 wherein the length adjusting apparatus also adjusts the length of the first and second optical delay lines.

20. The waveform synthesizer of claim 18 wherein the optical intensity modulator is an electroabsorption modulator having an electrical output and the tone selection filter is coupled to the electrical output of the electroabsorption modulator.

21. The waveform synthesizer of claim 17 wherein the means for compensating for environmental changes affecting the length of at least one of the first and second optical delay lines comprises a phase shifter disposed in the loop common portion and a feedback circuit including a tone selection filter coupled to the loop common portion and a mixer for mixing an output of the tone selection filter with a reference signal, an output of the mixer being operatively coupled to the phase shifter.

22. The waveform synthesizer of claim 21 wherein the optical intensity modulator is an electroabsorption modulator having an electrical output and the tone selection filter is coupled to the electrical output of the electroabsorption modulator.

23. The waveform synthesizer of claim 1 further comprising:
  a second RF-lightwave frequency-comb generator for generating a continuous wave comb comprising a second set of RF tones modulated onto a second lightwave carrier, said second set of RF tones comprising multiple upper and lower modulation sideband pairs; and
  a second multi-tone, frequency selective modulator coupled to the second RF-lightwave lightwave frequency-comb generator and configured to produce a second modulated RE-lightwave lightwave frequency comb.

24. The waveform synthesizer of claim 23 wherein the lightwave carrier and the second lightwave carrier are of different wavelength.

25. The waveform synthesizer of claim 23 further comprising:
a second photodetector for producing a synthesized RE waveform from said second lightwave carrier and said multiple upper and lower modulation sideband pairs in said second modulated RF-lightwave frequency comb.

26. The waveform synthesizer of claim 25 further comprising:
differential amplifier adapted to combine outputs of the photodetector and the second photodetector.

27. The waveform synthesizer of claim 25 further comprising:
a first optical modulator coupled to the multi-tone, frequency selective modulator and adapted to modulate a RF signal onto the modulated RE-lighwave frequency comb;
a second optical modulator coupled to the second multi-tone, frequency selective modulator and adapted to modulate a phase inverted RE signal onto the second modulated RF-lighwave frequency comb.

28. A method of synthesizing a frequency translated RF-modulated multi-tone lightwave waveform in the lightwave domain as well as a corresponding RF waveform in the RF domain, the method comprising:
generating a single frequency optical carrier;
generating RF modulation sideband tones on said optical carrier in the lightwave domain;
adjusting amplitudes of said sideband tones in the lightwave domain;
generating a single-tone lightwave reference; and
heterodyning said RF modulation sideband tones on said optical carrier with said single-tone lightwave reference.

29. The method of claim 28 wherein generating RF modulation sideband tones on said optical carrier comprises:
generating a RF-lightwave frequency-comb in multiple loops each having an optical delay line, the optical delay lines in the different loops each having an output and having different lengths,
photodetecting light at the outputs of the optical delay lines to thereby produce photodetected signals, and
applying the photodetected signals to an optical intensity modulator, the at least two optical delay lines receiving an optical output of the optical intensity modulator and the output of optical intensity modulator also being supplied to the multi-tone, frequency selective amplitude modulator.

30. The method of claim 29 wherein the at least one photodetector comprises multiple photodetectors with a separate photodetector in each loop.

31. The method of claim 28 wherein the amplitudes of the sideband tones are adjusted using a set of frequency selective optical reflectors or couplers which interact with the lightwave domain waveform in a waveguide.

32. The method of claim 31 wherein said set of frequency selective optical reflectors or couplers interact with said waveguide to conduct light away from said waveguide.

33. The method of claim 31 wherein the waveguide is an input waveguide and further including a output waveguide and wherein the set of frequency selective optical reflectors or couplers are arranged to interact with said input waveguide to conduct light away from said input waveguide and into said output waveguide.

34. The method of claim 33 wherein the light coupled by the set of frequency selective optical reflectors or couplers has its amplitude and/or phase modulated by a set of modulators.

35. The method of claim 31 wherein said set of frequency selective optical reflectors or couplers which interact with said waveguide include a set of circular-shaped resonators each having a different diameter and a corresponding different resonant optical frequency which corresponds to a frequency in said component frequencies of the waveform in the lightwave domain.

36. An optical multi-tone generator comprising:
a first optical delay line in a first loop for spacing a comb generated by the a multi-tone optical comb generator;
a second optical delay in a second loop line for noise reduction, the second delay line being longer than the first optical delay line;
at least one photodetector adapted to detect outputs of the first and second delay lines;
an optical intensity modulator in a loop portion common to the first and second loops for driving the first and second optical delay lines; and
means for compensating for environmental changes affecting a length of at least one of the first and second optical delay lines, wherein the means for compensating for environmental changes affecting the length of at least one of the first and second optical delay lines comprises a phase shifter disposed in the loop common portion and a feedback circuit including a tone selection filter coupled to the loop common portion and a mixer for mixing the output of the tone selection filter with a reference signal, an output of the mixer being operatively coupled to the phase shifter.

37. An optical multi-tone generator of claim 36 wherein the output of optical intensity modulator is being supplied to a multi-tone, frequency selective amplitude modulator.

38. The optical multi-tone generator of claim 36 wherein the at least one photodetector comprises multiple photodetectors with one photodetector in each loop.

39. The optical multi-tone generator of claim 36 wherein the loop common portion further includes an amplifier and a band pass filter.

40. The optical multi-tone generator of claim 39 wherein the amplifier is an electronic amplifier.

41. The optical multi-tone generator of claim 36 wherein the loop common portion further includes a band pass filter and wherein at least one of the first and second loops includes an optical amplifier therein.

42. The optical multi-tone generator of claim 36 wherein the optical intensity modulator is an electroabsorption modulator having an electrical output and the tone selection filter is coupled to the electrical output of the electroabsorption modulator.

43. An optical multi-tone generator comprising:
a first optical delay line in a first loop for spacing a comb generated by the a multi-tone optical comb generator;
a second optical delay in a second loop line for noise reduction, the second delay line being longer than the first optical delay line;
at least one photodetector adapted to detect outputs of the first and second delay lines;
an optical intensity modulator in a loop portion common to the first and second loops for driving the first and second optical delay lines; and
means for compensating for environmental changes affecting a length of at least one of the first and second optical delay lines, wherein the means for compensating for environmental changes affecting the length of at least one of the first and second optical delay lines comprises an apparatus for adjusting the length of at least one of the first and second optical delay lines and a feedback circuit including a tone selection filter coupled to the loop common portion and an electronic mixer for mixing the output of the tone selection filter with a reference signal, an output of the electronic mixer being operatively coupled to the length adjusting apparatus.

44. The optical multi-tone generator of claim 43 wherein the optical intensity modulator is an electroabsorption modulator having an electrical output and the tone selection filter is coupled to the electrical output of the electroabsorption modulator.

45. The optical multi-tone generator of claim 43 wherein the length adjusting apparatus adjusts the lengths of the first and second optical delay lines.

46. A method of synthesizing a frequency translated RE-modulated multi-tone lightwave waveform in the lightwave domain as well as a corresponding RE waveform in the RE domain, the method comprising:

generating a continuous wave comb using an RE-lightwave frequency-comb generator, the continuous wave comb comprising a set of RE tones modulated onto a lightwave carrier, said set of RE tones comprising multiple upper and lower modulation sideband pairs, the RE-lightwave frequency-comb generator comprising multiple loops each having an optical delay line, the optical delay lines in the different loops having different lengths, at least one photodetector, and an optical intensity modulator, the optical delay lines receiving an optical output of the optical intensity modulator, the output of the optical intensity modulator also being supplied to the multi-tone frequency selective modulator, the outputs of the optical delay lines being detected by said at least one photodetector, the output of the detector being coupled to the optical intensity modulator, wherein spacing between RE tones in said set of RE tones is determined by a delay through a shortest of the optical delay lines;

generating a modulated RE-lightwave frequency comb based on the continuous wave comb; and generating a synthesized RF waveform from said lightwave carrier and said multiple upper and lower modulation sideband pairs in said modulated RF-lightwave frequency comb.

47. A method of claim 46, further comprising:

generating a second continuous wave comb comprising a second set of RF tones modulated onto a second lightwave carrier, said second set of RE tones comprising multiple upper and lower modulation sideband pairs;

generating a second modulated RF-lightwave frequency comb based on the second continuous wave comb; and generating a second synthesized RE waveform from said second lightwave carrier and said multiple upper and lower modulation sideband pairs in said second modulated RF-lightwave frequency comb.

* * * * *